United States Patent
Nadir et al.

(10) Patent No.: US 12,394,076 B2
(45) Date of Patent: Aug. 19, 2025

(54) SYSTEM AND METHOD FOR FACIAL UN-DISTORTION IN DIGITAL IMAGES USING MULTIPLE IMAGING SENSORS

(71) Applicant: Samsung Electronics Co., Ltd., Suwon-si (KR)

(72) Inventors: Zeeshan Nadir, Allen, TX (US); Numair Khan, Providence, RI (US); Hamid Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 735 days.

(21) Appl. No.: 17/589,014

(22) Filed: Jan. 31, 2022

(65) Prior Publication Data

US 2023/0245330 A1 Aug. 3, 2023

(51) Int. Cl.
| | | |
|---|---|---|
| *G06T 7/33* | (2017.01) | |
| *G06T 3/147* | (2024.01) | |
| *G06T 5/77* | (2024.01) | |
| *G06T 7/40* | (2017.01) | |
| *G06T 7/50* | (2017.01) | |

(52) U.S. Cl.
CPC .............. *G06T 7/337* (2017.01); *G06T 3/147* (2024.01); *G06T 5/77* (2024.01); *G06T 7/40* (2013.01); *G06T 7/50* (2017.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| 8,447,098 B1 | 5/2013 | Cohen et al. |
|---|---|---|
| 9,049,355 B2 | 6/2015 | Lin et al. |

(Continued)

FOREIGN PATENT DOCUMENTS

| KR | 10-2223753 B1 | 3/2021 |
|---|---|---|
| KR | 10-2021-0070175 A | 6/2021 |

(Continued)

OTHER PUBLICATIONS

Shih et al., "Distortion-Free Wide-Angle Portraits on Camera Phones", ACM Trans. Graph., vol. 38, No. 4, Article 61, Jul. 2019, 12 pages.

(Continued)

*Primary Examiner* — Leon Viet Q Nguyen

(57) ABSTRACT

A method includes aligning landmark points between multiple distorted images to generate multiple aligned images, where the multiple distorted images exhibit perspective distortion in at least one face appearing in the multiple distorted images. The method also includes predicting a depth map using a disparity estimation neural network that receives the multiple aligned images as input. The method further includes generating a warp field using a selected one of the multiple aligned images. The method also includes performing a two-dimensional (2D) image projection on the selected aligned image using the depth map and the warp field to generate an undistorted image. In addition, the method includes filling in one or more missing pixels in the undistorted image using an inpainting neural network to generate a final undistorted image.

24 Claims, 12 Drawing Sheets

(56) References Cited

U.S. PATENT DOCUMENTS

| | | |
|---|---|---|
| 10,154,241 B2 | 12/2018 | Svortdal et al. |
| 10,540,806 B2 | 1/2020 | Yang et al. |
| 11,100,615 B2 | 8/2021 | Imai |
| 11,120,280 B2 | 9/2021 | Hu et al. |
| 11,475,546 B2 | 10/2022 | Roulet et al. |
| 2017/0018121 A1* | 1/2017 | Lawson .................. G06V 40/10 |
| 2017/0069056 A1 | 3/2017 | Sachs et al. |
| 2018/0240265 A1 | 8/2018 | Yang et al. |
| 2019/0004533 A1* | 1/2019 | Huang .................... G01S 17/86 |
| 2020/0394770 A1 | 12/2020 | Roulet et al. |
| 2021/0142497 A1* | 5/2021 | Pugh ....................... G06T 7/194 |
| 2021/0218950 A1 | 7/2021 | Watson et al. |
| 2022/0327657 A1* | 10/2022 | Zheng .................... G06V 10/82 |
| 2023/0070321 A1* | 3/2023 | Chen .................... G06V 10/774 |
| 2023/0077010 A1* | 3/2023 | Zhang ................. G06V 40/171 |

FOREIGN PATENT DOCUMENTS

| | | | | |
|---|---|---|---|---|
| WO | 2021096503 A1 | | 5/2021 | |
| WO | WO2021096503 | * | 5/2021 | ............... G06T 3/00 |

OTHER PUBLICATIONS

International Search Report and Written Opinion of the International Searching Authority dated Apr. 27, 2023 in connection with International Patent Application No. PCT/KR2023/001248, 11 pages.
Supplementary European Search Report dated Nov. 20, 2024, in connection with European Application No. 23747370.7, 11 pages.
Masiero, et al., "Initial Evaluation of 3D Reconstruction of Close Objects with Smartphone Stereo Vision," ISPRS TC I Mid-term Symposium "Innovative Sensing—From Sensors to Methods and Applications," Oct. 2018, 5 pages.

* cited by examiner

SYSTEM AND METHOD FOR FACIAL UN-DISTORTION IN DIGITAL IMAGES USING MULTIPLE IMAGING SENSORS

TECHNICAL FIELD

This disclosure relates generally to imaging systems. More specifically, this disclosure relates to a system and method for facial un-distortion in digital images using multiple imaging sensors.

BACKGROUND

With the recent developments in mobile device camera technology, it has become common for mobile device users to take "selfies." Since, by definition, a selfie is an image of the user taken by the user, selfie photos are commonly taken at an arm-length distance. This small distance can result in perspective distortion of a face that appear in the selfie. For example, in many selfies, the face appears narrower and the nose is enlarged compared to the actual face. Perspective distortion of faces can result in unappealing facial appearances in selfies. This can also result in unsatisfactory user experience, both in capturing selfies and during handheld video calls.

SUMMARY

This disclosure provides a system and method for facial un-distortion in digital images using multiple imaging sensors.

In a first embodiment, a method includes aligning landmark points between multiple distorted images to generate multiple aligned images, where the multiple distorted images exhibit perspective distortion in at least one face appearing in the multiple distorted images. The method also includes predicting a depth map using a disparity estimation neural network that receives the multiple aligned images as input. The method further includes generating a warp field using a selected one of the multiple aligned images. The method also includes performing a two-dimensional (2D) image projection on the selected aligned image using the depth map and the warp field to generate an undistorted image. In addition, the method includes filling in one or more missing pixels in the undistorted image using an inpainting neural network to generate a final undistorted image.

In a second embodiment, an electronic device includes at least one memory configured to store instructions. The electronic device also includes at least one processing device configured when executing the instructions to align landmark points between multiple distorted images to generate multiple aligned images, where the multiple distorted images exhibit perspective distortion in at least one face appearing in the multiple distorted images. The at least one processing device is also configured when executing the instructions to predict a depth map using a disparity estimation neural network that receives the multiple aligned images as input. The at least one processing device is further configured when executing the instructions to generate a warp field using a selected one of the multiple aligned images. The at least one processing device is also configured when executing the instructions to perform a 2D image projection on the selected aligned image using the depth map and the warp field to generate an undistorted image. In addition, the at least one processing device is configured when executing the instructions to fill in one or more missing pixels in the undistorted image using an inpainting neural network to generate a final undistorted image.

In a third embodiment, a non-transitory machine-readable medium contains instructions that when executed cause at least one processor of an electronic device to align landmark points between multiple distorted images to generate multiple aligned images, where the multiple distorted images exhibit perspective distortion in at least one face appearing in the multiple distorted images. The medium also contains instructions that when executed cause the at least one processor to predict a depth map using a disparity estimation neural network that receives the multiple aligned images as input. The medium further contains instructions that when executed cause the at least one processor to generate a warp field using a selected one of the multiple aligned images. The medium also contains instructions that when executed cause the at least one processor to perform a 2D image projection on the selected aligned image using the depth map and the warp field to generate an undistorted image. In addition, the medium contains instructions that when executed cause the at least one processor to fill in one or more missing pixels in the undistorted image using an inpainting neural network to generate a final undistorted image.

In a fourth embodiment, a method includes identifying landmark points on a face portion of a person appearing in an undistorted ground truth image. The method also includes generating a three-dimensional (3D) face model that fits the landmark points of the face portion, where the 3D face model includes depth information of the face portion. The method further includes performing a perspective projection using the undistorted ground truth image and the depth information of the face portion to generate left and right distorted image pixel locations. The method also includes generating left and right warp fields based on the left and right distorted image pixel locations. In addition, the method includes performing a 2D image projection on the undistorted ground truth image using the 3D face model and the left and right warp fields to generate a stereo image pair.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, with the recent developments in mobile device camera technology, it has become common for mobile device users to take "selfies." Since, by definition, a selfie is an image of the user taken by the user, selfie photos are commonly taken at an arm-length distance. This small distance can result in perspective distortion of a face that appear in the selfie. For example, in many selfies, the face appears narrower and the nose is enlarged compared to the actual face. Here, perspective distortion is distinguished from other types of image distortion, such as caused by sensor noise or malfunction. Perspective distortion of faces can result in unappealing facial appearances in selfies. This can also result in unsatisfactory user experience, both in capturing selfies and during handheld video calls. Some techniques have been developed to fix perspective distortion in selfies. However, these techniques are implemented post-capture and require a depth map of the subject. These techniques therefore require additional complicated algorithms and/or depth sensors, both of which add complexity to a smartphone or other mobile device.

This disclosure provides systems and methods for facial un-distortion in digital images using multiple imaging sensors. As described in more detail below, the disclosed systems and methods receive a distorted pair of images captured with multiple imaging sensors and correct perspective distortion of human faces in the images without the use of a pre-generated depth map. In some embodiments, the disclosed systems and methods use an end-to-end differentiable deep learning pipeline to correct the perspective distortion. In addition, the disclosed systems and methods allow for variable distance between the multiple imaging sensors, as well as variable focal lengths and sensor gains. Compared to prior techniques, the disclosed embodiments achieve significant improvement in facial distortion correction without requiring the use of a depth sensor. Note that while some of the embodiments discussed below are described in the context of use in consumer electronic devices, such as smartphones or tablet computers, this are merely examples. It will be understood that the principles of this disclosure may be implemented in any number of other suitable contexts.

Figure 1:
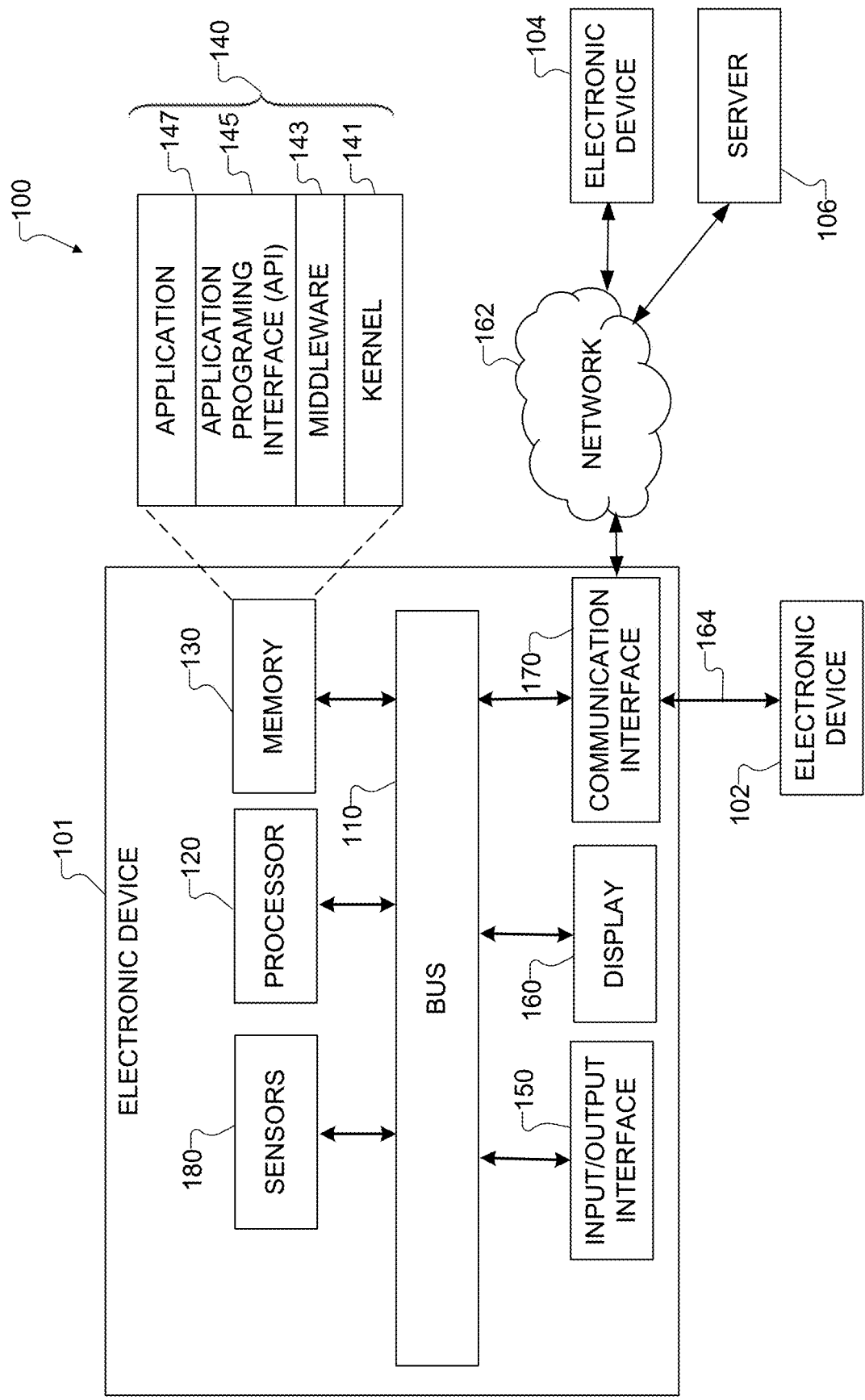
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for facial un-distortion in digital images using multiple cameras or other imaging sensors.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for facial un-distortion in digital images using multiple cameras or other imaging sensors as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for facial un-distortion in digital images using multiple cameras or other imaging sensors.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A through 2G illustrate an example training framework 200 for facial un-distortion in digital images using multiple imaging sensors according to this disclosure. For ease of explanation, the framework 200 is described as being implemented using one or more components of the electronic device 101 described above. However, this is merely one example, and the framework 200 could be implemented using any other suitable device(s), such as when implemented using the server 106.

Figure 2A:
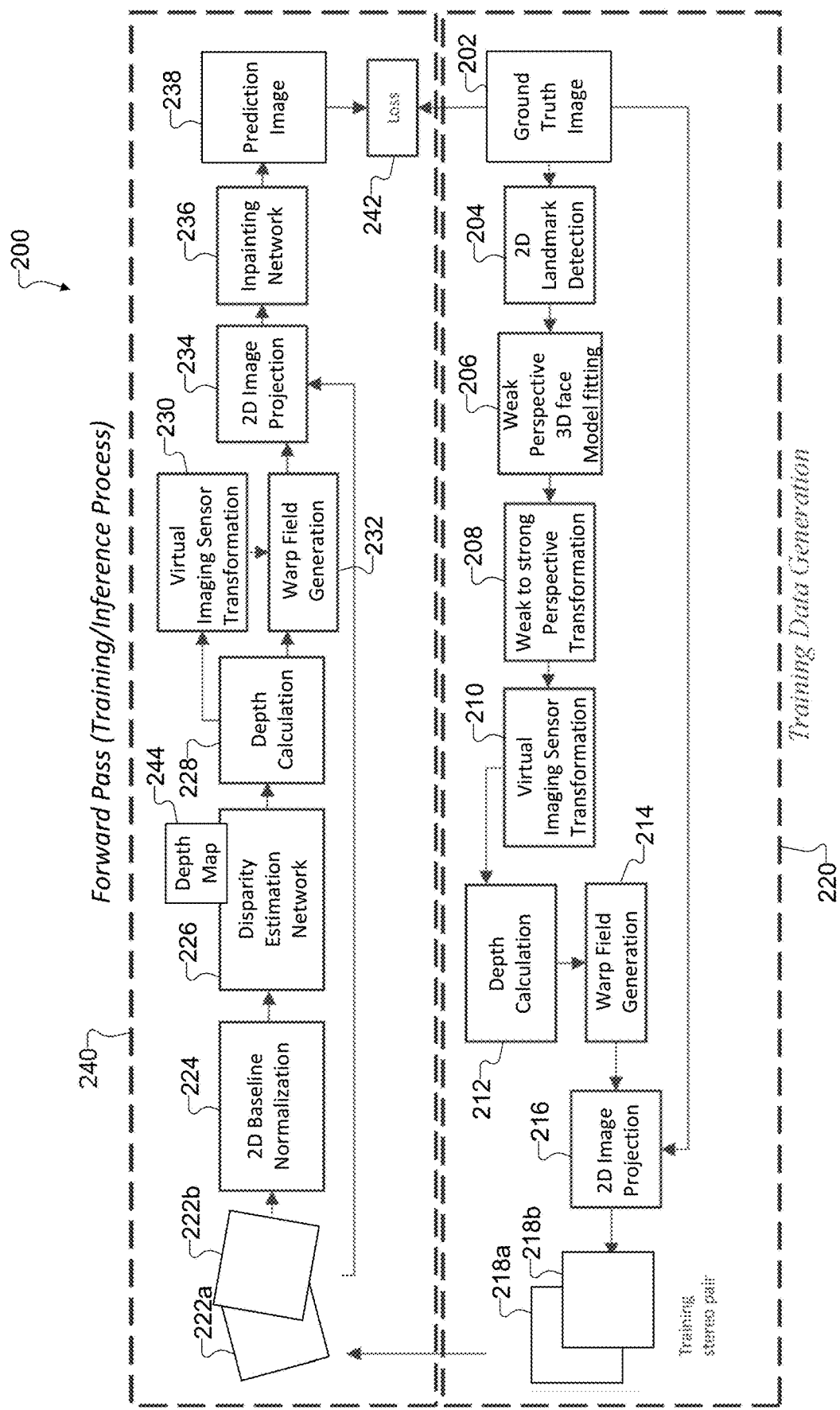
FIGS. 2A through 2G illustrate an example training framework for facial un-distortion in digital images using multiple imaging sensors according to this disclosure.

As shown in FIG. 2A, the framework 200 includes a training data generation process 220 and a training process 240. As described in greater detail below, the training data generation process 220 is performed to generate training data (in the form of training stereo pairs 218a-218b) that can be used in the training process 240. The framework 200 provides a number of advantages or benefits over prior training techniques. Correction of perspective distortion typically requires a depth map of the face, but the framework 200 does not require a depth map as an input. Existing depth map techniques do not provide sufficient resolution on the face area. For example, such depth maps may not provide a clear indication where certain facial elements (such as eyes, nose, ears, chin, and the like) are located. Thus, it is difficult to correct for facial distortions using these depth maps. As described in greater detail below, the framework 200 generates suitable depth maps that can used in the training process 240.

Starting with the training data generation process 220, the electronic device 101 obtains at least one ground truth image 202. The ground truth image 202 represents a "clean" image of a person's face that includes no distortion. Each ground truth image 202 can be obtained in any suitable manner. For example, the electronic device 101 can obtain the ground truth image 202 from an image database. Using the ground truth image 202 as an input, the electronic device 101 performs a two-dimensional (2D) landmark detection process 204 to identify specific landmarks (such as eyes, nose, nostrils, corners of lips, a contour of a jaw line, and the like) on the face shown in the ground truth image 202.

Figure 2B:
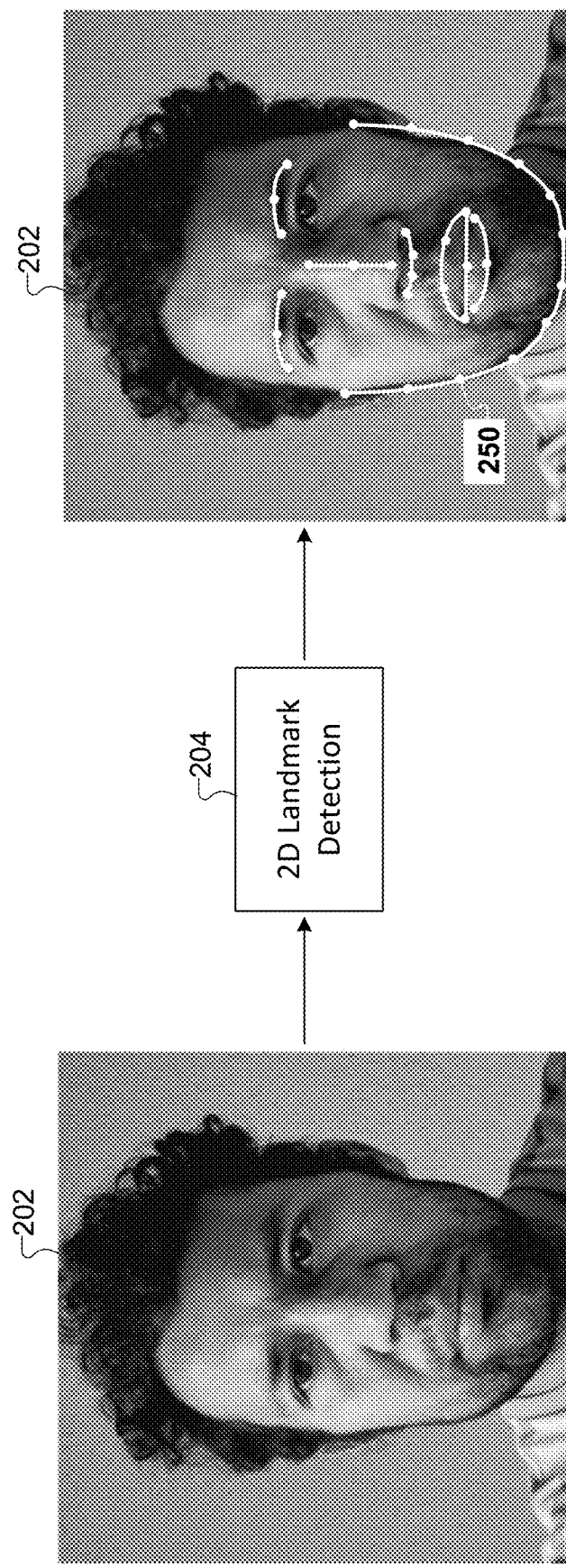

FIG. 2B illustrates an example of the 2D landmark detection process 204. As shown in FIG. 2B, using the 2D landmark detection process 204, the electronic device 101 obtains a set of key points, referred to as landmark points 250, on the ground truth image 202. The landmark points 250 can correspond to a pre-defined set of locations that are used in fitting a face model to the ground truth image 202. As shown in FIG. 2B, the landmark points 250 can include locations such as eyebrows, eye corners, lip corners, a chin contour, and the like. The 2D landmark detection process 204 represents any suitable landmark detection technique, including learning- or non-learning-based techniques. In some cases, the 2D landmark detection process 204 can be expressed mathematically as follows:

$$\Phi:I \rightarrow \{(x_1,y_1),(x_2,y_2), \ldots (x_L,y_L)\} \quad (1)$$

where $\Phi$ represents the 2D landmark detection process 204, I represents the ground truth image 202, and $(x_L, y_L)$ represents each of the landmark points 250.

Figure 2C:
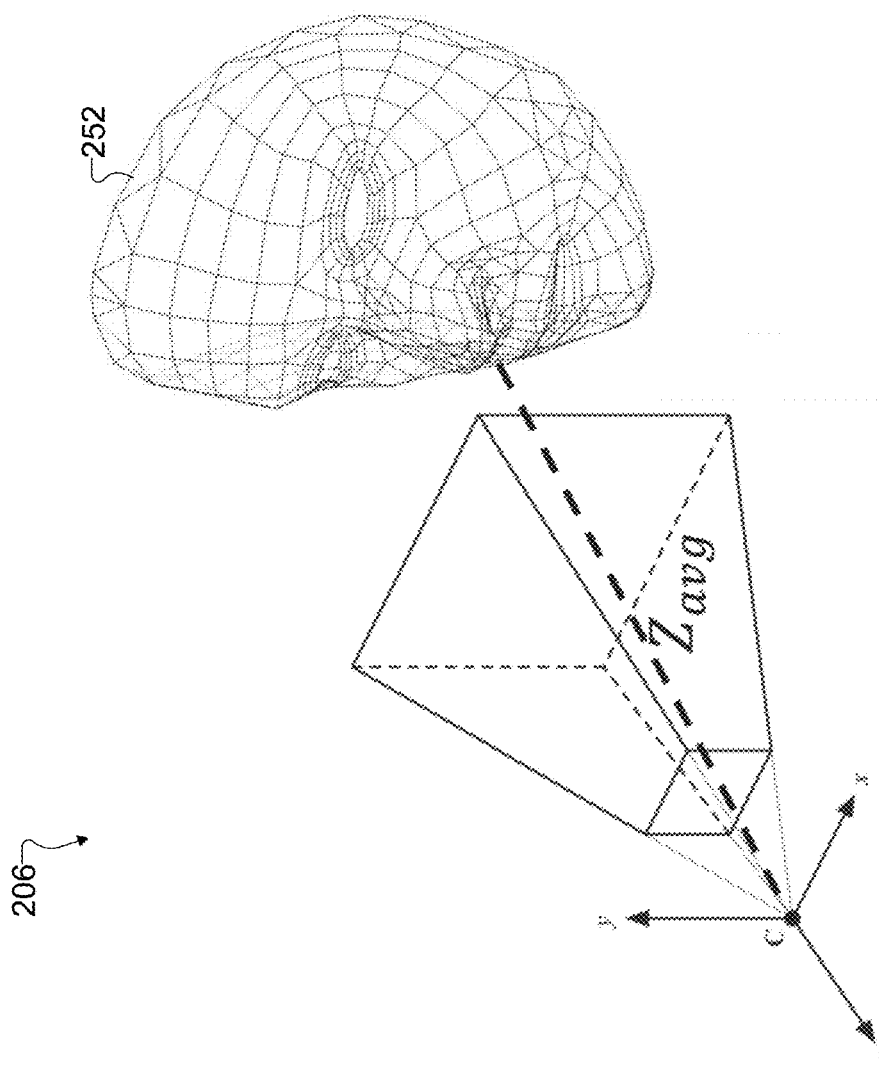

Using the set of landmark points 250 as an input, the electronic device 101 performs a weak perspective three-dimensional (3D) face model fitting process 206 to generate a 3D model of the face in the ground truth image 202, where the 3D model can explain the landmark points 250. Here, a weak perspective model represents use of a virtual camera or other virtual imaging sensor that is relatively far away from the subject, thereby having weaker perspective distortion (as compared to a relatively close virtual imaging sensor, which would generate a stronger perspective distortion). FIG. 2C illustrates additional details of an example weak perspective 3D face model fitting process 206. As shown in FIG. 2C, a face model 252 is a 3D projection obtained using the weak perspective 3D face model fitting process 206. The point C represents the optical center of the camera system which is used to measure the distance of the subject from the camera. The parameter $Z_{avg}$ represents the average distance of the subject from the optical center of the camera system.

The 3D model 252 can be represented by a set of face model parameters, which are obtained by projecting corresponding landmark points of the 3D model 252 onto the face portion of the ground truth image 202 and minimizing the distance between the landmark points 250 and the projected landmark points of the 3D model 252. In projecting the landmark points from the 3D model to the 2D image plane, the weak perspective 3D face model fitting process 206 assumes a large distance between the subject and the imaging sensor. That is, a weak perspective model is assumed because the ground truth image 202 is distortion free, so it is assumed that the ground truth image 202 is obtained at a large distance. Thus, the relative depths of facial features are negligible compared with the imaging sensor-to-subject distance. The projection of each landmark point 250 can be represented by the following:

$$x = \frac{X}{Z_{avg}}, y = \frac{Y}{Z_{avg}} \quad (2)$$

where X and Y represent coordinates of landmark points on the 3D model 252, and $Z_{avg}$ represent the average subject-to-imaging sensor distance. It is noted that $Z_{avg}$ is a constant and is much larger than the values of X and Y. For example, in some embodiments, $Z_{avg}$ is at least one hundred times larger than the values of X and Y, although other multiples are possible. It is also noted that for the purposes of mathematical simplicity and without loss of generality, the focal length is assumed to be equal to a constant value of 1 (in any units which are being used).

The weak perspective 3D face model fitting process 206 represents any suitable technique for generating a 3D model of a face from a given input image under the assumption that the camera to subject distance is large. In some embodiments, the weak perspective 3D face model fitting process 206 uses a FLAME model technique to generate the 3D model, although other techniques are possible and within the scope of this disclosure.

After the weak perspective 3D face model fitting process 206, the electronic device 101 performs a weak-to-strong perspective transformation process 208, which simulates moving the virtual imaging sensor closer to the subject. The electronic device 101 also reprojects all the pixels of the input ground truth image using their depth information from the fitted 3D model 252, thereby generating a stronger perspective distortion model (since perspective distortion is stronger at closer distances). Using the weak-to-strong perspective transformation process 208, the electronic device 101 obtains new pixel locations for a distorted image that has the appearance of being captured from a short distance. In some embodiments, the electronic device 101 uses a strong perspective model that can be represented by the following (assuming a focal length of 1):

$$x' = \frac{X}{Z}, y' = \frac{Y}{Z} \tag{3}$$

where X, Y, Z represent the 3D locations of the landmark points on the 3D model 252 with respect to the camera optical center (origin) C, and (x', y') represent new 2D locations of the pixels in the distorted image. In Equation (3), the denominator Z is variable and can change for each landmark point. The values of Z may be much less than the value of $Z_{avg}$ in Equation (2) because the virtual imaging sensor has been moved much closer to the subject.

In some cases, the calculations using Equation (3) can be performed twice in the weak-to-strong perspective transformation process 208, once for each distorted image of a training stereo pair 218a-218b. As discussed in greater detail below, each image of the training stereo pair 218a-218b represents an image taken from a different imaging sensor of an electronic device, such as a dual imaging sensor smartphone or other electronic device having a left imaging sensor and a right imaging sensor. Each imaging sensor inherently has a different origin C as shown in FIG. 2C since the imaging sensors are disposed at different positions on the electronic device.

After the weak-to-strong perspective transformation process 208, the electronic device 101 performs a virtual imaging sensor transformation process 210 and a depth calculation process 212. The virtual imaging sensor transformation process 210 is performed to obtain new distance values for the distorted images using the depth values from the 3D model 252. The electronic device 101 can perform any suitable virtual imaging sensor transformation process 210. The depth calculation process 212 is performed to convert distance units of the depth values (such as meters, centimeters, inches, or the like) into pixels.

Figure 2D:
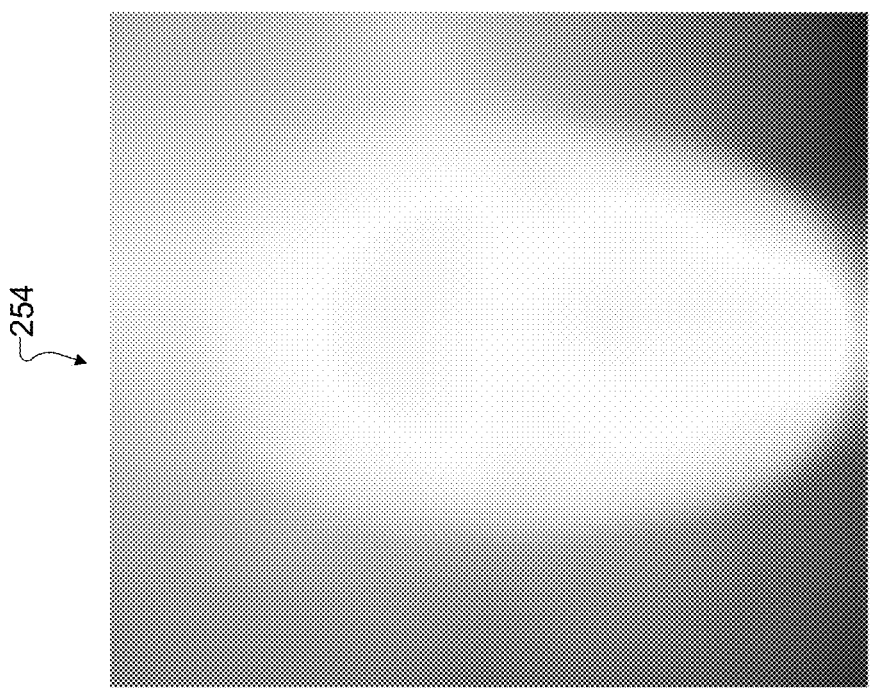

After the depth calculation process 212, the electronic device 101 performs a warp field generation process 214 to generate warp fields corresponding to the left and right imaging sensors. FIG. 2D illustrates an example of a warp field 254 generated by the warp field generation process 214. As shown in FIG. 2D, the warp field 254 represents a 2D-to-2D mapping of pixels between the undistorted ground truth image 202 and the distorted images obtained in the weak-to-strong perspective transformation process 208. In the warp field generation process 214, the electronic device 101 may generate each warp field 254 by calculating the difference between undistorted pixel locations (x, y) obtained in the weak perspective 3D face model fitting process 206 and the distorted pixel locations (x', y') obtained in the weak-to-strong perspective transformation process 208. Mathematically, this can be expressed as obtaining a difference vector d for each pixel location as follows.

$$d = \begin{bmatrix} x' - x \\ y' - y \end{bmatrix} \tag{4}$$

The difference vector d can be used to obtain the new location of a pixel in the distorted image plane. In the warp field generation process 214, the electronic device 101 computes a left warp field 254 corresponding to the left imaging sensor and a right warp field 254 corresponding to the right imaging sensor. Each warp field 254 can be based on a different origin C as shown in FIG. 2C since the left and right imaging sensors are disposed at different positions.

Figure 2E:
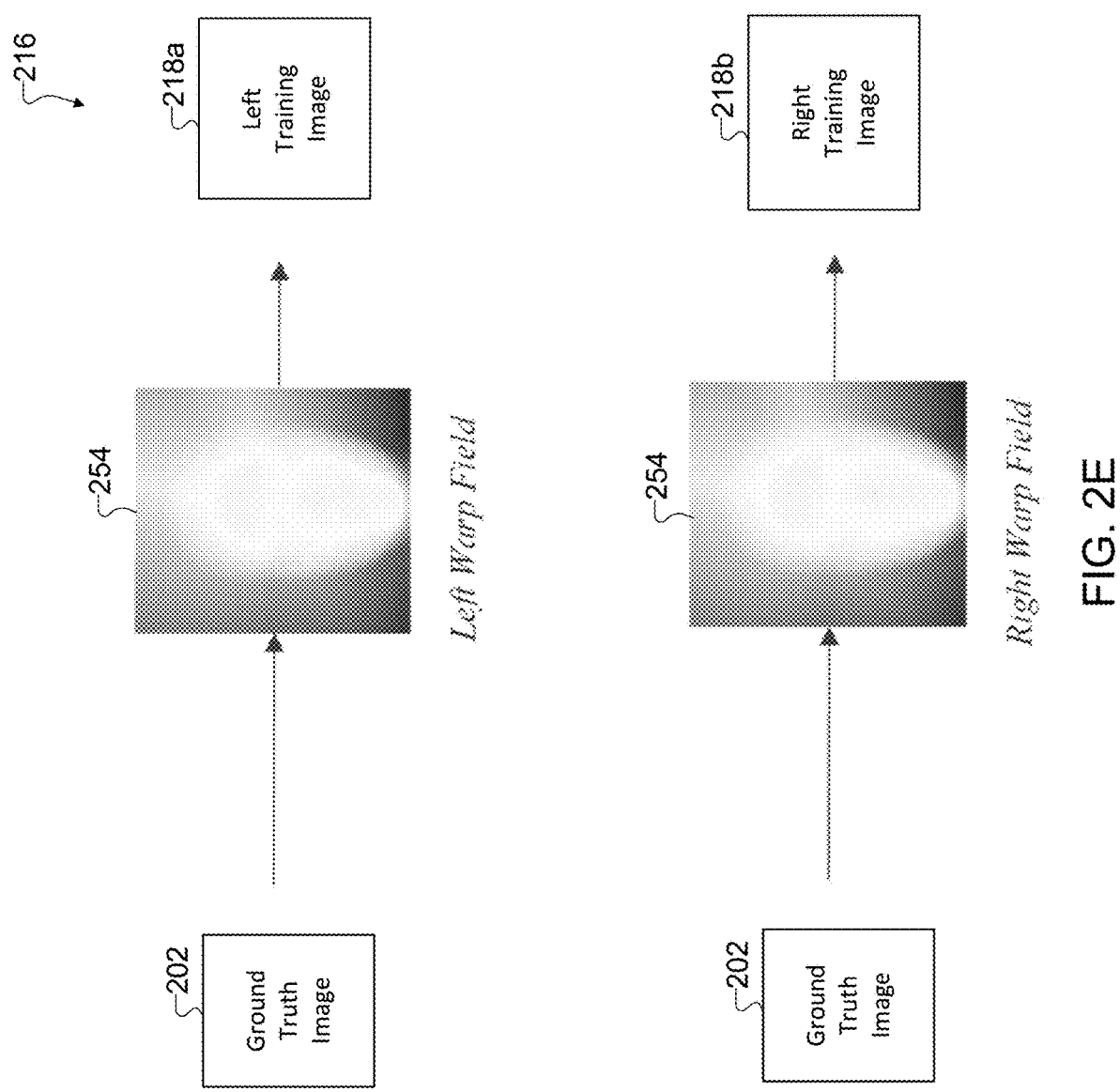

After the electronic device 101 generates the warp fields 254, the electronic device 101 performs a 2D image projection process 216 on the ground truth image 202 to generate a training stereo pair 218a-218b, which are the distorted images that can be used for training. FIG. 2E illustrates an example of the 2D image projection process 216. As shown in FIG. 2E, the electronic device 101 projects the ground truth image 202 twice, once using the left warp field 254 and once using the right warp field 254. Each projection results in one of the training stereo pair 218a-218b. The left training image 218a and the right training image 218b exhibit perspective distortion that is not present in the ground truth image 202. The 2D image projection process 216 represents any suitable technique for 2D image projecting using a warp field.

Returning to FIG. 2A, it is shown that the training data generation process 220 results in the training stereo pair 218a-218b. The training stereo pair 218a-218b can, in turn, be used as an input to the training process 240, which is performed to generate a prediction image 238. The training process 240 will now be described in greater detail.

In the training process 240, the electronic device 101 obtains one or more pairs of distorted images 222a-222b, which represent two distorted images (such as left and right distorted images) that exhibit perspective distortion in a person's face shown in the distorted images 222a-222b. Each pair of distorted images 222a-222b can represent a training stereo pair 218a-218b generated during the training data generation process 220. Using the distorted images 222a-222b as input, the electronic device 101 performs a 2D baseline normalization process 224 to address variable parametric differences that can occur between different imaging sensors. For example, stereo imaging sensors used during training might be different than the imaging sensor used to generate a ground truth image 202. Different imaging sensors and devices can exhibit parametric differences, such as sensor sensitivities, calibrations, focal lengths, and the baseline distance between the imaging sensors in a given device. The electronic device 101 performs the 2D baseline normalization process 224 to remove any baseline differences or "disparities" that exist between the distorted images 222a-222b, thereby "normalizing" the distorted images 222a-222b.

In some cases, the 2D baseline normalization process 224 removes the baseline disparity by aligning a subset of the landmark points 250 identified during the training data generation process 220 (such as only the nostrils of the face). Using the subset of landmark points 250, the faces can be aligned between the distorted images 222a-222b such that the landmark points 250 appear at nearby locations in the 2D grid. The 2D baseline normalization process 224 can use one or more transformations, such as an affine transformation, to align the images. An affine transformation can rotate an image (such as to account for sensor alignment), scale an image (such as to account for focal length differences), and translate an image (such as to account for baseline distance differences). This can be expressed mathematically as follows:

$$y=Ax+b \quad (5)$$

where y represents the coordinates of a transformed point, x represents the coordinates of an input point, A represents a matrix that models rotation and scaling, and b represents a vector that models translation.

Figure 2F:
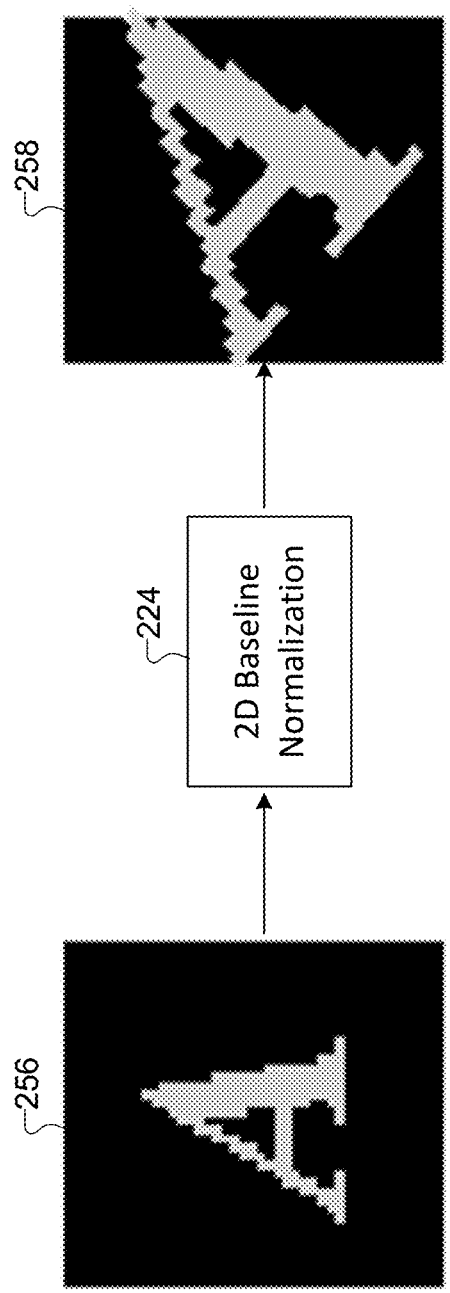

FIG. 2F illustrates an example of the 2D baseline normalization process 224. As shown in FIG. 2F, the electronic device 101 performs the 2D baseline normalization process 224 on an input image 256, which can represent one of the distorted images 222a-222b. The resulting image 258 exhibits one or more transformations, such as rotation, scaling, and translation. The resulting transformations depicted in the resulting images 256a-256b are exaggerated as shown, but this illustrate the types of transformations that can occur.

The 2D baseline normalization process 224 can also account for brightness differences between sensors. For example, the 2D baseline normalization process 224 can use histogram equalization to make the images of the distorted images 222a-222b have similar brightness. Of course, histogram equalization is only an example technique for equalizing brightness between images, and any other suitable technique can be used.

After the 2D baseline normalization process 224, the electronic device 101 trains a disparity estimation network 226 using the distorted images 222a-222b. The disparity estimation network 226 is a deep learning network (DNN), such as a convolutional neural network (CNN). Deep learning networks may require training using a large number (such as dozens, hundreds, or thousands) of training data to perform at high levels of accuracy. Thus, the electronic device 101 performs the training process 240, in part, to train the disparity estimation network 226. The disparity estimation network 226 accepts the distorted images 222a-222b as input and, for each pair, predicts a depth map 244 (such as in units of pixels). Each depth map 244 is a mapping of how far an object is away from an imaging sensor as represented by each pixel. The disparity estimation network 226 represents any suitable deep learning network or other machine learning model that is trained to predict depth maps using distorted images. Each depth map 244 represents the depth of each pixel in the associated distorted images 222a-222b. In some embodiments, the disparity estimation network 226 includes multiple layers, which can include one or more encoder layers, decoder layers, and the like.

After obtaining the depth map 244 using the disparity estimation network 226, the electronic device 101 performs a depth calculation process 228 to convert the disparity from pixel units to physical distance units (such as meters, centimeters, inches, or the like) using one or more parameters of the imaging sensor model. Essentially, the depth calculation process 228 rescales the depth map 244 into different units to make the depth map 244 better suited for downstream processes.

Figure 2G:
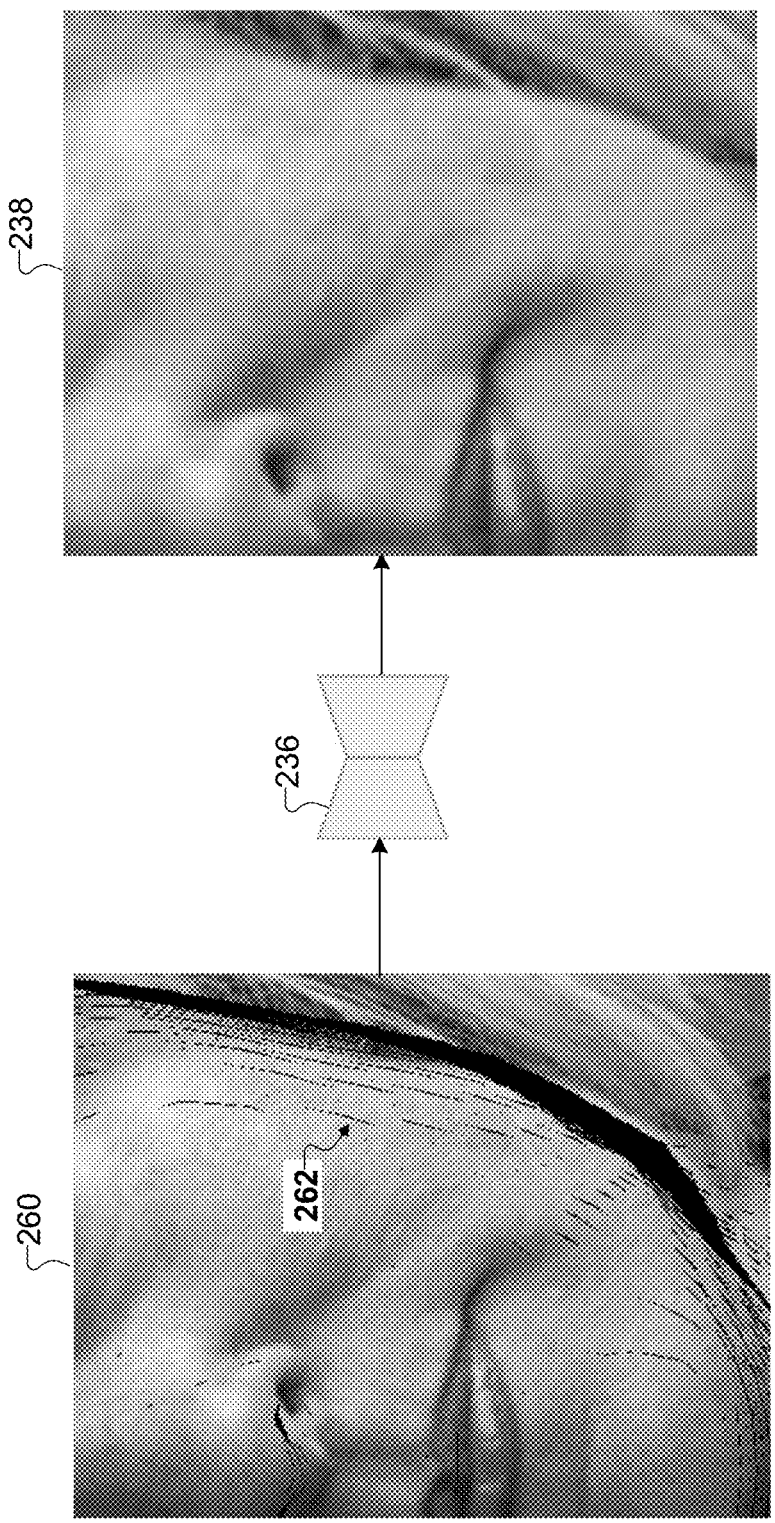

After the electronic device 101 uses the disparity estimation network 226 to obtain a depth map 244, the electronic device 101 performs a virtual imaging sensor transformation process 230 to "virtually" move a virtual imaging sensor further away from a subject. Moving the virtual imaging sensor to be further away corresponds to a reduction in perspective distortion as discussed above. In some embodiments, the virtual imaging sensor transformation process 230 includes adding a constant distance vector to every pixel in a selected one of the distorted images 222a-222b (such as the distorted image 222a). After the virtual imaging sensor transformation process 230, the electronic device 101 performs a warp field generation process 232 using the selected distorted image 222a to generate a warp field. The warp field generation process 232 is similar to the warp field generation process 214 of the training data generation process 220 discussed above, expect the warp field generated in the warp field generation process 232 is used to eliminate the distortion in the distorted image 222a (in contrast to the warp fields 254, which are used to introduce distortion to the ground truth image 202). Using the depth map 244 and the warp field generated in the warp field generation process 232, the electronic device 101 performs a 2D image projection process 234 on the distorted image 222a to generate an undistorted image 260, an example of which is shown in FIG. 2G. The 2D image projection process 234 is similar to the 2D image projection process 216 of the training data generation process 220 discussed above.

As shown in FIG. 2G, the undistorted image 260 generated using the 2D image projection process 216 may include one or more unfilled areas (or "holes") 262, which represent missing pixels in the undistorted image 260. The holes 262 can occur because the projection of a distorted image into an undistorted image may cause discrepancies that cannot be fully reconciled during the 2D image projection process 216. For example, as the virtual imaging sensor is moved further away from the subject, additional areas surrounding the subject may be brought into view. To address this, the electronic device 101 implements an inpainting network 236 to "fill in" the holes 262 in the undistorted image 260. FIG. 2G illustrates an example use of the inpainting network 236. As shown in FIG. 2G, the inpainting network 236 receives the undistorted image 260 with holes 262 and generates a prediction image 238 without holes 262. The inpainting network 236 represents any suitable learning network or other machine learning model that is trained to perform inpainting to fill holes in an image. In some embodiments, the inpainting network 236 is a deep learning network such as a CNN. In some embodiments, the electronic device 101 can perform the training process 240, in part, to train the inpainting network 236.

The prediction image 238 represents a prediction of what is actually shown in the ground truth image 202. However, the prediction may not be entirely accurate, especially early in training. Thus, the training process 240 is performed iteratively, and a loss 242 can be calculated for each iteration. The loss 242 is calculated to represent the difference between the ground truth image 202 and the prediction image 238. The electronic device 101 may calculate the loss 242 using any suitable metric for image quality, such as L1, structural similarity index (SSIM), multi-scale SSIM (MS-SSIM), and the like. An example of a loss function is given below:

$$\text{Loss} = \Sigma_{i=1}^{P}(X_i - \hat{X}_i)^2 \quad (6)$$

where $X_i$ represents the value of the $i^{th}$ pixel in the ground truth image 202, and $\hat{X}_i$ represents the value of the $i^{th}$ pixel in the prediction image 238. Of course, this is merely one example, and other loss function calculations can be used. Once the loss 242 is calculated, the electronic device 101 uses the loss 242 to tune one or more network weights. For example, in the training process 240, both the disparity estimation network 226 and the inpainting network 236 include weights that are updated based on the calculated loss 242, such as via a backpropagation algorithm. Once the weights are updated, the electronic device 101 can perform another iteration of the training process 240, and the iterations can continue until the loss 242 is acceptably small or until one or more other criteria are met (such as a specified amount of time elapsing or a specified number of training iterations completing).

Although FIGS. 2A through 2G illustrates one example of a training framework 200 for facial un-distortion in digital images using multiple imaging sensors and related details, various changes may be made to FIGS. 2A through 2G. For example, while the framework 200 is described with various examples of machine learning models and tasks, other embodiments could include other machine learning models and/or other tasks. Also, while shown as a specific sequence of operations, various operations shown in FIGS. 2A through 2G could overlap, occur in parallel, occur in a different order, or occur any number of times (including zero times). In addition, the specific operations shown in FIGS. 2A through 2G are examples only, and other techniques could be used to perform each of the operations shown in FIGS. 2A through 2G.

Figure 3:
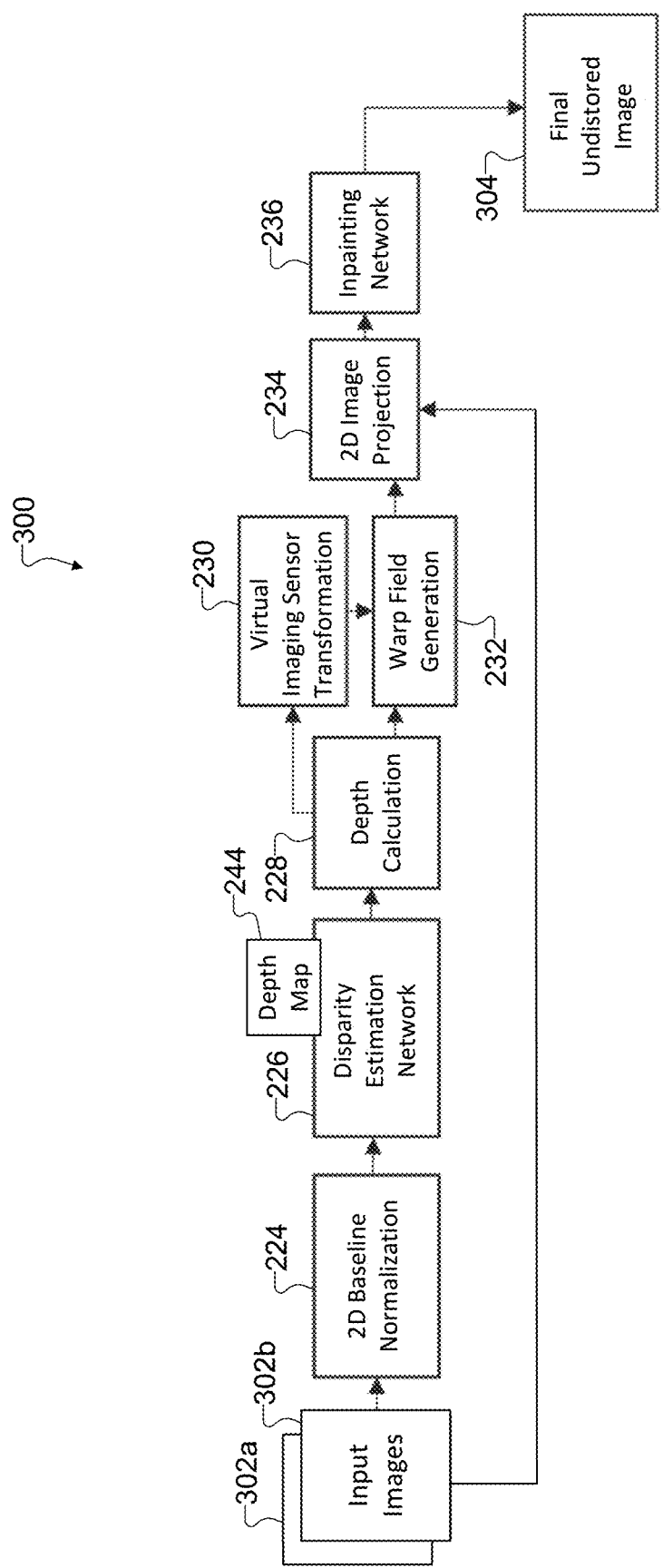
FIG. 3 illustrates an example process for facial un-distortion in digital images using multiple imaging sensors according to this disclosure.

FIG. 3 illustrates an example process 300 for facial un-distortion in digital images using multiple imaging sensors according to this disclosure. For ease of explanation, the process 300 is described as being implemented using one or more components of the electronic device 101, which in this case can represent a consumer electronic device (such as a smartphone). However, this is merely one example, and the process 300 could be implemented using any other suitable device(s), such as when implemented using the server 106.

As shown in FIG. 3, the process 300 uses many of the same components and operations as the training process 240 of the framework 200. In this example, the electronic device 101 obtains two images 302a-302b of a scene that show a face of a person in the scene. For example, the electronic device 101 may include dual imaging sensors 180, and the images 302a-302b may be captured by the dual imaging sensors 180 of the electronic device 101 at the same time. Each of the images 302a-302b may a selfie captured by a user of the electronic device 101 and may include an amount of perspective distortion, including around the user's face.

Using the images 302a-302b as input, the electronic device 101 performs the 2D baseline normalization process 224 to address parametric differences that can occur between the dual imaging sensors of the electronic device 101. For example, the electronic device 101 may perform the 2D baseline normalization process 224 to remove any baseline disparities that exist between the images 302a-302b, thereby aligning the images 302a-302b. After the 2D baseline normalization process 224, the electronic device 101 provides the aligned images 302a-302b as input to the disparity estimation network 226. The disparity estimation network uses the aligned images 302a-302b to predict the depth map 244, such as in units of pixels. The electronic device 101 also performs a depth calculation process 228 to convert the disparity from pixel units to physical distance units (such as meters, centimeters, inches, or the like).

The electronic device 101 performs the virtual imaging sensor transformation process 230 to "virtually" make the subject in the images 302a-302b appear more distant. After the virtual imaging sensor transformation process 230, the electronic device 101 performs a warp field generation process 232 to generate a warp field, which is used to eliminate the distortion in a selected one of the images 302a-302b (such as the image 302a). Using the warp field generated in the warp field generation process 232, the electronic device 101 performs a 2D image projection process 234 on the image 302a to generate an undistorted image 260. The electronic device 101 implements the inpainting network 236 to fill in any holes 262 (such as missing pixels) in the undistorted image 260 and generate a final undistorted image 304. The final undistorted image 304 can be output, saved, displayed to a user of the electronic device 101, provided as input to another image processing technique, or used in any other suitable manner.

Although FIG. 3 illustrates one example of a process 300 for facial un-distortion in digital images using multiple imaging sensors, various changes may be made to FIG. 3. For example, while the images 302a-302b are described as being captured by imaging sensors 180 of the electronic device 101, the images 302a-302b could be captured by dual imaging sensors of another device and later sent to the electronic device 101. Also, while shown as a specific sequence of operations, various operations shown in FIG. 3 could overlap, occur in parallel, occur in a different order, or occur any number of times (including zero times). In addition, the specific operations shown in FIG. 3 are examples only, and other techniques could be used to perform each of the operations shown in FIG. 3.

Note that the operations and functions shown in FIGS. 2A through 3 can be implemented in an electronic device 101, server 106, or other device in any suitable manner. For example, in some embodiments, the operations and functions shown in FIGS. 2A through 3 can be implemented or supported using one or more software applications or other software instructions that are executed by the processor 120 of the electronic device 101, server 106, or other device. In other embodiments, at least some of the operations and functions shown in FIGS. 2A through 3 can be implemented or supported using dedicated hardware components. In general, the operations and functions shown in FIGS. 2A through 3 can be performed using any suitable hardware or any suitable combination of hardware and software/firmware instructions.

Figure 4C:
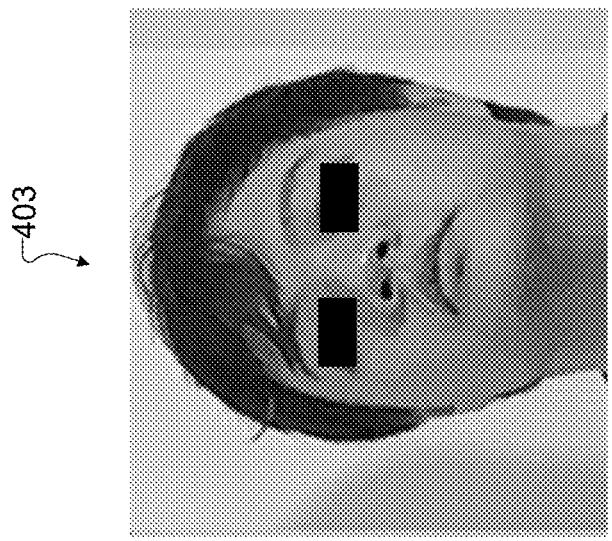
FIGS. 4A through 4C illustrate examples of benefits that can be realized using one or more of the embodiments of this disclosure.
Figure 4B:
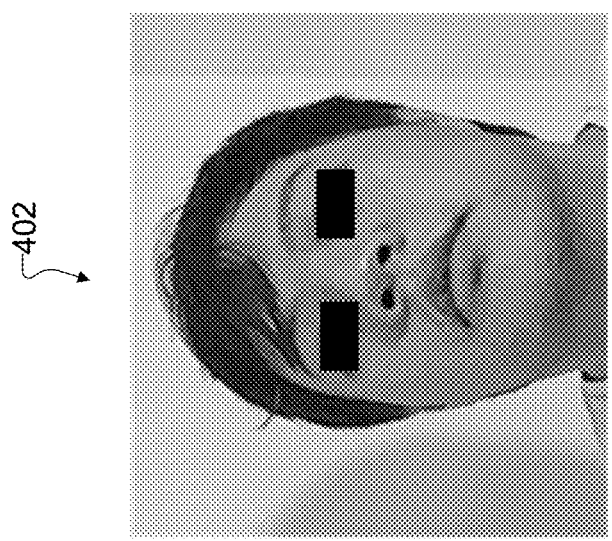
Figure 4A:
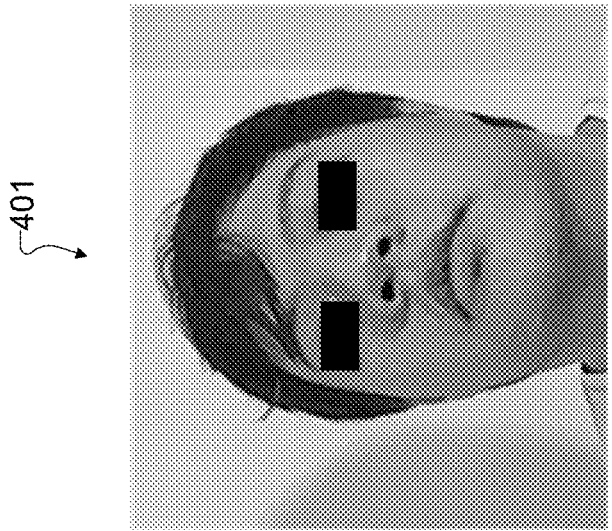

FIGS. 4A through 4C illustrate examples of benefits that can be realized using one or more of the embodiments of this disclosure. In FIGS. 4A and 4B, the images 401 and 402 were captured at the same time by two imaging sensors of a dual imaging sensor smartphone. As evident by FIGS. 4A and 4B, the images 401 and 402 exhibit perspective distortion. For example, the subject's face is too narrow, while the subject's nose and mouth are exaggerated. In FIG. 4C, the image 403 is obtained by performing the facial un-distortion process 300 using the disparity estimation network 226 and inpainting network 236, which have been trained using the training process 240. As evident by FIG. 4C, the resulting image 403 shows the subject's face without distortion; for example, the mouth and nose appear distortion free in FIG. 4C. It is noted that the subject's eyes have been hidden in the images 401-403 for privacy reasons.

Although FIGS. 4A through 4C illustrate examples of benefits that can be realized using one or more of the embodiments of this disclosure, various changes may be made to FIGS. 4A through 4C. For example, images can be captured of numerous scenes under different lighting conditions and from different distances and angles, and these figures do not limit the scope of this disclosure. These figures are merely meant to illustrate example types of benefits that might be obtainable using the techniques described above.

Figure 5:
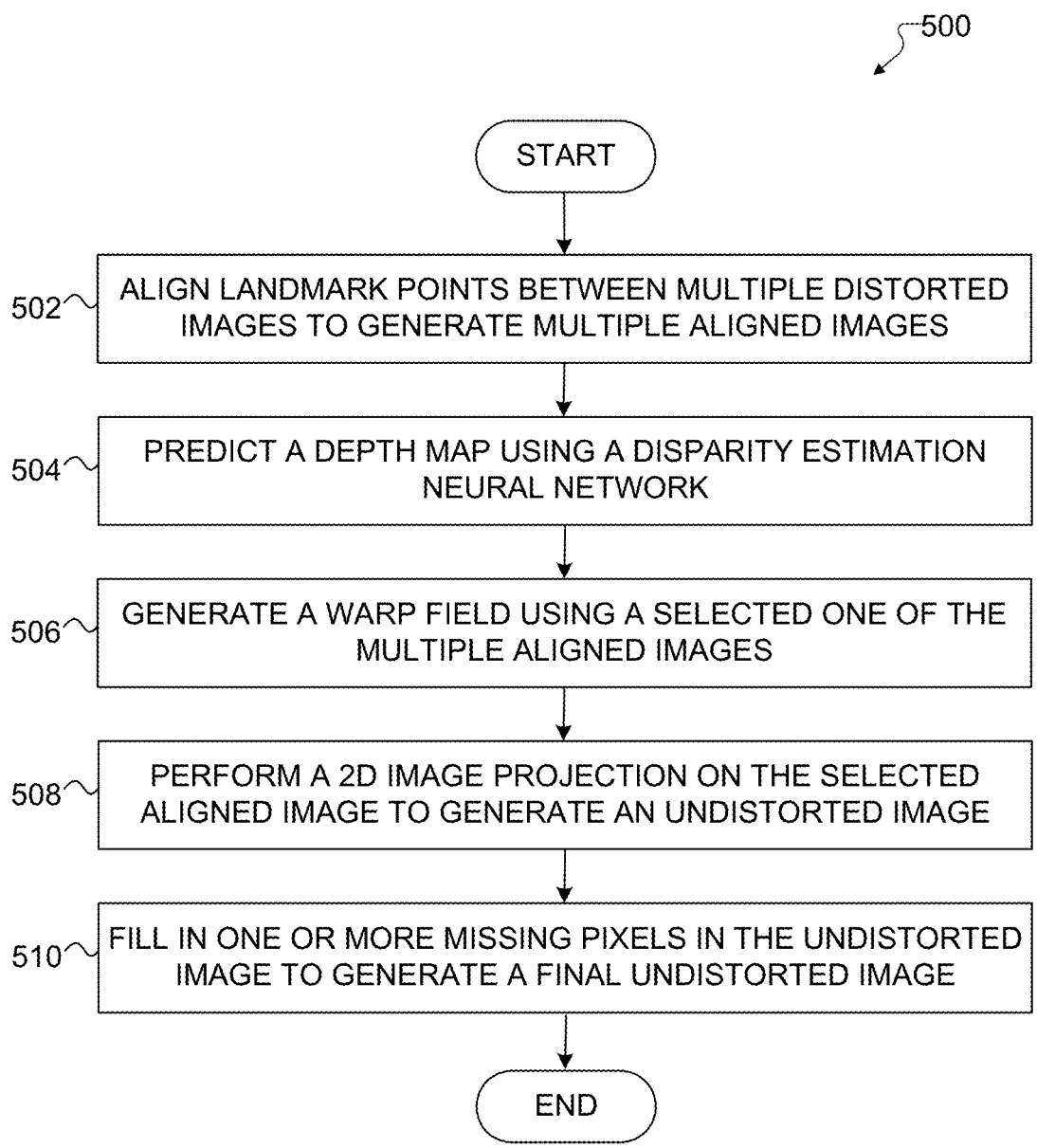
FIG. 5 illustrates an example method for facial un-distortion in digital images using multiple imaging sensors according to this disclosure.

FIG. 5 illustrates an example method 500 for facial un-distortion in digital images using multiple imaging sensors according to this disclosure. For ease of explanation, the method 500 shown in FIG. 5 is described as involving the use of the electronic device 101 shown in FIG. 1 and the process 300 shown in FIG. 3. However, the method 500 shown in FIG. 5 could be used with any other suitable electronic device (such as the server 106) and any suitable process.

As shown in FIG. 5, landmark points are aligned between multiple distorted images to generate multiple aligned images at step 502. This could include, for example, the electronic device 101 aligning landmark points 250 between the distorted images 222a-222b to generate multiple aligned images 222a-222b. The multiple distorted images exhibit perspective distortion in at least one face appearing in the multiple distorted images. A depth map is predicted using a disparity estimation neural network that receives the multiple aligned images as input at step 504. This could include, for example, the electronic device 101 predicting the depth map 244 using the disparity estimation network 226, which receives the multiple aligned images 222a-222b as input.

A warp field is generated using a selected one of the multiple aligned images at step 506. This could include, for example, the electronic device 101 performing the warp field generation process 232 using a selected one of the multiple aligned images 222a-222b to generate a warp field 254. A 2D image projection is performed on the selected aligned image using the depth map and the warp field to generate an undistorted image at step 508. This could include, for example, the electronic device 101 performing the 2D image projection process 234 to generate an undistorted image 260. One or more missing pixels are filled in within the undistorted image using an inpainting neural network to generate a final undistorted image at step 510. This could include, for example, the electronic device 101 implementing the inpainting network 236 to fill in one or more missing pixels in the undistorted image 260 to generate the final undistorted image 304.

Although FIG. 5 illustrates one example of a method 500 for facial un-distortion in digital images using multiple imaging sensors, various changes may be made to FIG. 5. For example, while shown as a series of steps, various steps in FIG. 5 could overlap, occur in parallel, occur in a different order, or occur any number of times.

Figure 6:
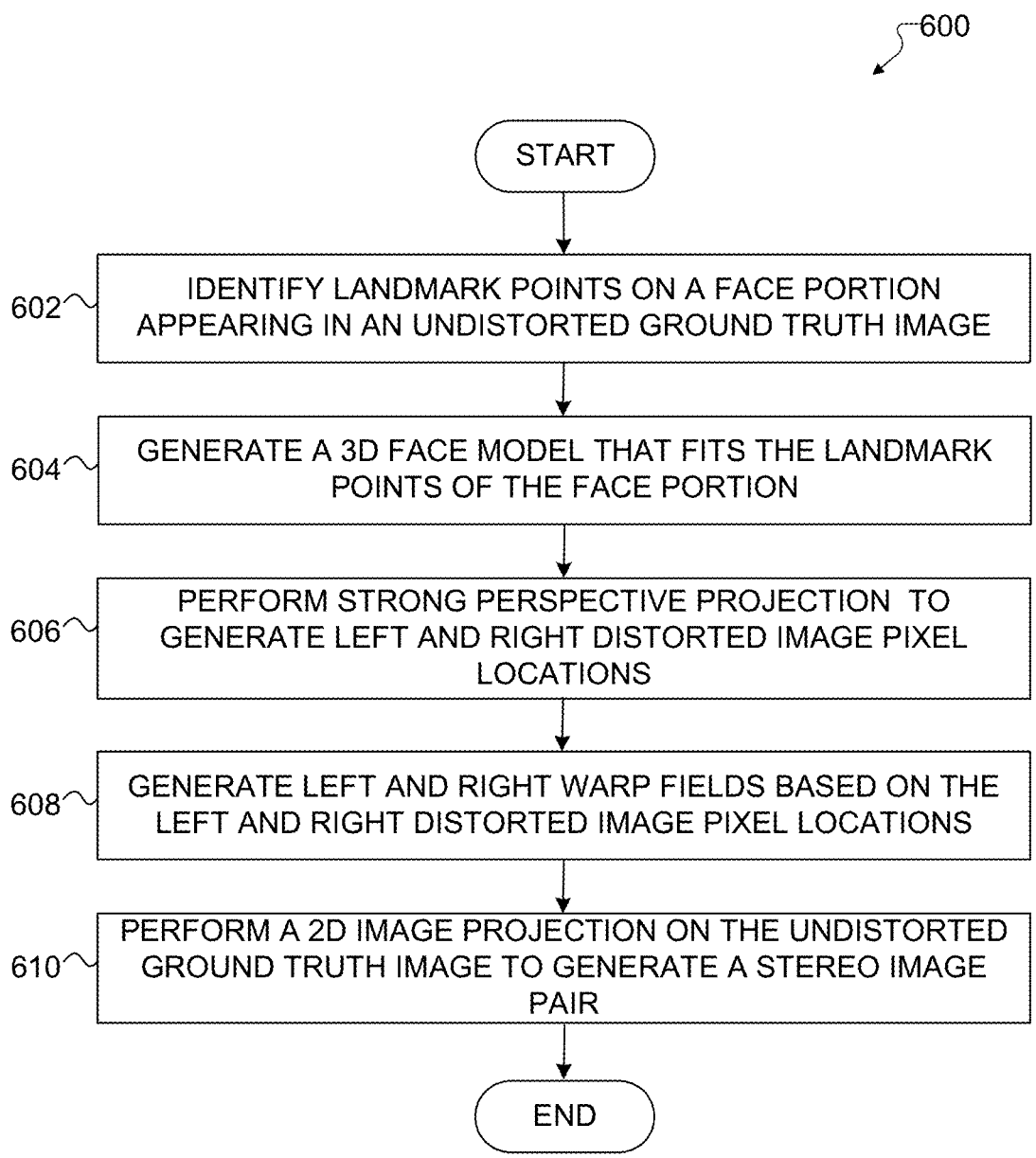
FIG. 6 illustrates an example method for generating and using training data according to this disclosure.

FIG. 6 illustrates an example method 600 for generating and using training data according to this disclosure. For ease of explanation, the method 600 shown in FIG. 6 is described as involving the use of the electronic device 101 shown in FIG. 1 and the framework 200 shown in FIGS. 2A through 2G. However, the method 600 shown in FIG. 6 could be used with any other suitable electronic device (such as the server 106) and any suitable process.

As shown in FIG. 6, landmark points are identified on a face portion of a person appearing in an undistorted ground truth image at step 602. This could include, for example, the electronic device 101 identifying landmark points 250 on a face portion of a person appearing in the ground truth image 202. A 3D face model is generated that fits the landmark points of the face portion at step 604. This could include, for example, the electronic device 101 generating the 3D model 252, which fits the landmark points 250 of the face portion. The 3D face model includes depth information of the face portion.

A strong perspective projection is performed using the undistorted ground truth image and the depth information of the face portion to generate left and right distorted image pixel locations at step 606. This could include, for example, the electronic device 101 performing the weak-to-strong perspective transformation process 208 using the ground truth image 202 and the depth information of the face portion to generate left and right distorted image pixel locations (x', y'). Left and right warp fields are generated based on the left and right distorted image pixel locations at step 608. This could include, for example, the electronic device 101 generating the left and right warp fields 254 based on the left and right distorted image pixel locations. A 2D image projection is performed on the undistorted ground truth image using the 3D face model and the left and right warp fields to generate a stereo image pair at step 610. This could include, for example, the electronic device 101 performing the 2D image projection process 216 on the ground truth image 202 using the 3D model 252 and the left and right warp fields 254 to generate the training stereo pair 218a-218b.

Although FIG. 6 illustrates one example of a method 600 for generating and using training data, various changes may be made to FIG. 6. For example, while shown as a series of steps, various steps in FIG. 6 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   aligning landmark points between multiple distorted images to generate multiple aligned images, wherein the multiple distorted images exhibit perspective distortion in at least one face appearing in the multiple distorted images, and wherein the landmark points are aligned to correct baseline disparities between the multiple distorted images caused by differences in at least one of: sensor sensitivities, calibrations, focal lengths, and baseline distance between imaging sensors;
   predicting a depth map using a disparity estimation neural network that receives the multiple aligned images as input;
   generating a warp field using a selected one of the multiple aligned images;
   performing a two-dimensional (2D) image projection on the selected aligned image using the depth map and the warp field to generate an undistorted image, wherein the undistorted image includes one or more missing pixels as a result of the 2D image projection; and
   filling in the one or more missing pixels in the undistorted image using an inpainting neural network to generate a final undistorted image.

2. The method of claim 1, wherein the disparity estimation neural network and the inpainting neural network are trained by adjusting weights based on a loss value determined according to differences between an undistorted ground truth image and a predicted image generated using the disparity estimation neural network and the inpainting neural network.

3. The method of claim 1, wherein the multiple distorted images are captured by dual imaging sensors of an electronic device.

4. The method of claim 1, further comprising:
before generating the warp field, virtually making one or more subjects in the selected aligned image more distant by adding a constant distance vector to each pixel in the selected aligned image.

5. The method of claim 1, wherein the landmark points are aligned using an affine transformation.

6. A method comprising:
aligning landmark points between multiple distorted images to generate multiple aligned images, wherein the multiple distorted images exhibit perspective distortion in at least one face appearing in the multiple distorted images;
adjusting for brightness differences between the multiple distorted images using histogram equalization such that the multiple distorted images have similar brightness;
predicting a depth map using a disparity estimation neural network that receives the multiple aligned images as input;
generating a warp field using a selected one of the multiple aligned images;
performing a two-dimensional (2D) image projection on the selected aligned image using the depth map and the warp field to generate an undistorted image, wherein the undistorted image includes one or more missing pixels as a result of the 2D image projection;
filling in the one or more missing pixels in the undistorted image using an inpainting neural network to generate a final undistorted image.

7. An electronic device comprising:
at least one memory configured to store instructions; and
at least one processing device configured when executing the instructions to:
align landmark points between multiple distorted images to generate multiple aligned images, wherein the multiple distorted images exhibit perspective distortion in at least one face appearing in the multiple distorted images;
predict a depth map using a disparity estimation neural network that receives the multiple aligned images as input;
generate a warp field using a selected one of the multiple aligned images;
perform a two-dimensional (2D) image projection on the selected aligned image using the depth map and the warp field to generate an undistorted image, wherein the undistorted image includes one or more missing pixels as a result of the 2D image projection; and
fill in the one or more missing pixels in the undistorted image using an inpainting neural network to generate a final undistorted image;
wherein the disparity estimation neural network and the inpainting neural network are trained by adjusting weights based on a loss value determined according to differences between an undistorted ground truth image and a predicted image generated using the disparity estimation neural network and the inpainting neural network.

8. The electronic device of claim 7, wherein the multiple distorted images comprise images captured by dual imaging sensors of the electronic device or another electronic device.

9. The electronic device of claim 7, wherein the at least one processing device is further configured when executing the instructions to:
before generating the warp field, virtually make one or more subjects in the selected aligned image more distant by adding a constant distance vector to each pixel in the selected aligned image.

10. The electronic device of claim 7, wherein the at least one processing device is configured to align the landmark points to correct baseline disparities between the multiple distorted images caused by differences in at least one of: sensor sensitivities, calibrations, focal lengths, and baseline distance between imaging sensors.

11. The electronic device of claim 7, wherein the at least one processing device is configured to align the landmark points using an affine transformation.

12. The electronic device of claim 7, wherein the at least one processing device is further configured when executing the instructions to adjust for brightness differences between the multiple distorted images using histogram equalization such that the multiple distorted images have similar brightness.

13. A non-transitory machine-readable medium containing instructions that when executed cause at least one processor of an electronic device to:
align landmark points between multiple distorted images to generate multiple aligned images, wherein the multiple distorted images exhibit perspective distortion in at least one face appearing in the multiple distorted images;
predict a depth map using a disparity estimation neural network that receives the multiple aligned images as input;
virtually make one or more subjects in a selected one of the multiple aligned images more distant by adding a constant distance vector to each pixel in the selected aligned image;
generate a warp field using the selected aligned image;
perform a two-dimensional (2D) image projection on the selected aligned image using the depth map and the warp field to generate an undistorted image, wherein the undistorted image includes one or more missing pixels as a result of the 2D image projection; and
fill in the one or more missing pixels in the undistorted image using an inpainting neural network to generate a final undistorted image.

14. The non-transitory machine-readable medium of claim 13, wherein the disparity estimation neural network and the inpainting neural network are trained by adjusting weights based on a loss value determined according to differences between an undistorted ground truth image and a predicted image generated using the disparity estimation neural network and the inpainting neural network.

15. The non-transitory machine-readable medium of claim 13, wherein the multiple distorted images comprise images captured by dual imaging sensors of the electronic device or another electronic device.

16. The non-transitory machine-readable medium of claim 13, wherein the instructions when executed cause at least one processor to align the landmark points to correct baseline disparities between the multiple distorted images caused by differences in at least one of: sensor sensitivities, calibrations, focal lengths, and baseline distance between imaging sensors.

17. The non-transitory machine-readable medium of claim 13, wherein the instructions when executed cause the at least one processor to align the landmark points using an affine transformation.

18. The method of claim 6, wherein the landmark points are aligned to correct baseline disparities between the multiple distorted images caused by differences in at least one of: sensor sensitivities, calibrations, focal lengths, and baseline distance between imaging sensors.

19. The method of claim 6, further comprising:
before generating the warp field, virtually making one or more subjects in the selected aligned image more distant by adding a constant distance vector to each pixel in the selected aligned image.

20. The method of claim 18, further comprising:
before generating the warp field, virtually making one or more subjects in the selected aligned image more distant by adding a constant distance vector to each pixel in the selected aligned image.

21. The method of claim 6, wherein the disparity estimation neural network and the inpainting neural network are trained by adjusting weights based on a loss value determined according to differences between an undistorted ground truth image and a predicted image generated using the disparity estimation neural network and the inpainting neural network.

22. The method of claim 18, wherein the disparity estimation neural network and the inpainting neural network are trained by adjusting weights based on a loss value determined according to differences between an undistorted ground truth image and a predicted image generated using the disparity estimation neural network and the inpainting neural network.

23. The method of claim 19, wherein the disparity estimation neural network and the inpainting neural network are trained by adjusting weights based on a loss value determined according to differences between an undistorted ground truth image and a predicted image generated using the disparity estimation neural network and the inpainting neural network.

24. The method of claim 20, wherein the disparity estimation neural network and the inpainting neural network are trained by adjusting weights based on a loss value determined according to differences between an undistorted ground truth image and a predicted image generated using the disparity estimation neural network and the inpainting neural network.

* * * * *